United States Patent
Dutta et al.

(10) Patent No.: US 11,070,136 B2
(45) Date of Patent: *Jul. 20, 2021

(54) SYSTEM FOR CONTROLLING A DIRECT-CURRENT-TO-DIRECT-CURRENT CONVERTER TO PROVIDE ELECTRICAL ENERGY TO A VEHICLE IMPLEMENT

(71) Applicant: Deere & Company, Moline, IL (US)

(72) Inventors: Sumit Dutta, Fargo, ND (US); Long Wu, Fargo, ND (US); Shuvam Gupta, Wauwatosa, WI (US); David M. Loken, West Fargo, ND (US); Eric R. Linn, Klindred, ND (US)

(73) Assignee: Deere & Company, Moline, IL (US)

( * ) Notice: Subject to any disclaimer, the term of this patent is extended or adjusted under 35 U.S.C. 154(b) by 83 days.

This patent is subject to a terminal disclaimer.

(21) Appl. No.: 16/669,691

(22) Filed: Oct. 31, 2019

(65) Prior Publication Data
US 2021/0135582 A1 May 6, 2021

(51) Int. Cl.
*H02M 3/335* (2006.01)
*B60L 50/10* (2019.01)
(Continued)

(52) U.S. Cl.
CPC ......... *H02M 3/33576* (2013.01); *B60L 50/10* (2019.02); *H02M 3/33507* (2013.01);
(Continued)

(58) Field of Classification Search
CPC ..... B60L 50/10; B60L 2210/10; B60W 20/00; H02K 7/006; H02M 2001/0006;
(Continued)

(56) References Cited

U.S. PATENT DOCUMENTS 6,067,237 A * 5/2000 Nguyen ............ H02M 3/33584
363/132
6,809,678 B2 10/2004 Vera et al.
(Continued)

FOREIGN PATENT DOCUMENTS

| EP | 1995108 A1 | 11/2008 |
|---|---|---|
| EP | 2200167 A2 | 6/2010 |
| EP | 2966764 A1 | 1/2016 |

OTHER PUBLICATIONS

Basile, Bart and Manish Bhardwaj. "TI Designs: TIDA-010039 Three-Level, Three-Phase SiC AC-to-DC Converter Reference Design." Texas Instruments [online], Nov. 2018 [retrieved on Jul. 15, 2020]. Retrieved from the Internet: <https://www.ti.com/lit/ug/tiduej5/tiduej5.pdf?ts=1608643867256&ref_url=https%253A%252F%252F>.

(Continued)

*Primary Examiner* — Yusef A Ahmed

(57) ABSTRACT

Each one of the secondary converters has a corresponding transformer having a primary winding associated with a primary alternating current (AC) signal and a secondary winding associated with a secondary alternating current (AC) signal. A secondary controller provides secondary control signals to the secondary semiconductor switches of the secondary converters with one or more time-synchronized, target phase offsets with respect to an observed phase of the alternating current signal (e.g., primary alternating current signal or the secondary alternating current signal) to provide the target phase offset (or targeted phase offsets) commensurate with or sufficient to support a required electrical energy transfer from the primary controller to the corresponding secondary controller (or secondary controllers).

18 Claims, 7 Drawing Sheets

(51) Int. Cl.
  *A01C 7/00*  (2006.01)
  *A01C 19/00* (2006.01)
  *A01C 7/08*  (2006.01)

(52) U.S. Cl.
  CPC ............... *A01C 7/00* (2013.01); *A01C 7/08* (2013.01); *A01C 19/00* (2013.01)

(58) Field of Classification Search
  CPC ...... H02M 2001/007; A01C 7/00; A01C 7/08; A01C 19/00
  See application file for complete search history.

(56) References Cited

U.S. PATENT DOCUMENTS

| | | | |
|---|---|---|---|
| 7,149,097 B1 | 12/2006 | Shteynberg et al. | |
| 7,990,098 B2* | 8/2011 | Perisic | B60L 50/61 318/801 |
| 8,355,265 B2 | 1/2013 | Gengenbach | |
| 8,780,585 B2 | 7/2014 | Ye | |
| 10,050,534 B1* | 8/2018 | Murthy-Bellur | H02M 3/24 |
| 10,263,456 B1* | 4/2019 | Wang | H02M 3/33584 |
| 10,804,809 B1* | 10/2020 | Yelaverthi | H02J 7/0018 |
| 2009/0251925 A1 | 10/2009 | Usui et al. | |
| 2010/0308559 A1* | 12/2010 | Tarasinski | A01B 59/00 280/422 |
| 2011/0181104 A1* | 7/2011 | Kamaga | B60L 50/61 307/9.1 |
| 2011/0215743 A1* | 9/2011 | Fukatsu | B60L 53/24 318/139 |
| 2011/0254379 A1* | 10/2011 | Madawala | H02J 5/005 307/104 |
| 2013/0272036 A1 | 10/2013 | Fang | |
| 2014/0334189 A1 | 11/2014 | Yan et al. | |
| 2015/0180350 A1* | 6/2015 | Huang | H02J 9/06 307/66 |
| 2015/0210173 A1* | 7/2015 | Funabashi | B60L 1/006 307/10.1 |
| 2015/0229225 A1* | 8/2015 | Jang | H02M 3/33569 363/17 |
| 2015/0375633 A1* | 12/2015 | Masuda | B60L 15/007 320/109 |
| 2016/0254756 A1* | 9/2016 | Yang | H01F 27/24 363/21.02 |
| 2016/0268916 A1* | 9/2016 | Ramsay | H04W 72/04 |
| 2017/0005584 A1* | 1/2017 | Guepratte | H02M 3/33561 |
| 2017/0324319 A1 | 11/2017 | Mok et al. | |
| 2019/0190393 A1* | 6/2019 | Murakami | H02M 3/33561 |
| 2019/0379291 A1* | 12/2019 | Xue | H02M 7/219 |
| 2019/0379292 A1* | 12/2019 | Fei | H01F 27/24 |
| 2020/0014306 A1* | 1/2020 | Riar | H02M 3/33584 |
| 2020/0212815 A1* | 7/2020 | Yamasaki | H02J 7/007 |
| 2020/0259337 A1* | 8/2020 | DeCock | H02M 7/493 |
| 2020/0389095 A1* | 12/2020 | Kajiyama | H02M 3/156 |
| 2020/0412238 A1* | 12/2020 | Zhu | H02M 3/33569 |
| 2021/0021224 A1* | 1/2021 | Niimura | H02M 7/49 |
| 2021/0067048 A1* | 3/2021 | Zhang | H02M 3/335 |

OTHER PUBLICATIONS

Corradini, L., E. Tedeschi, and P. Mattavelli. "Advantages of the symmetric-on time modulator in multiple-sampled digitally controlled DC-DC converters." In 2007 IEEE Power Electronics Specialists Conference, pp. 1974-1980. IEEE, 2007.

Xu, Jin; Matthew Armstrong, and Maher Al-Greer. "Parameter Estimation of DC-DC Converters Using Recursive Algorithms with Adjustable Iteration Frequency." In 2018 IEEE 19th Workshop on Control and Modeling for Power Electronics (COMPEL), pp. 1-8. IEEE, 2018.

European Search Report issued in counterpart application No. 20202958.3 dated Mar. 15, 2021 (09 pages).

European Search Report issued in counterpart application No. 20202962.5 dated Mar. 23, 2021 (11 pages).

Himanshu Mishra and Amit Kumar Jain, Single Current Sensor Based Vector Control of AC/DC Front End Converter, pp. 1-5, IEEE, 2014.

* cited by examiner

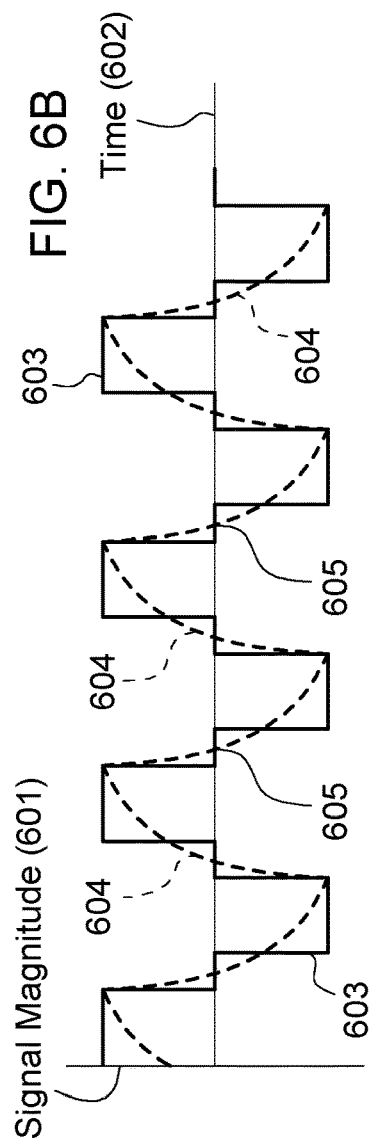
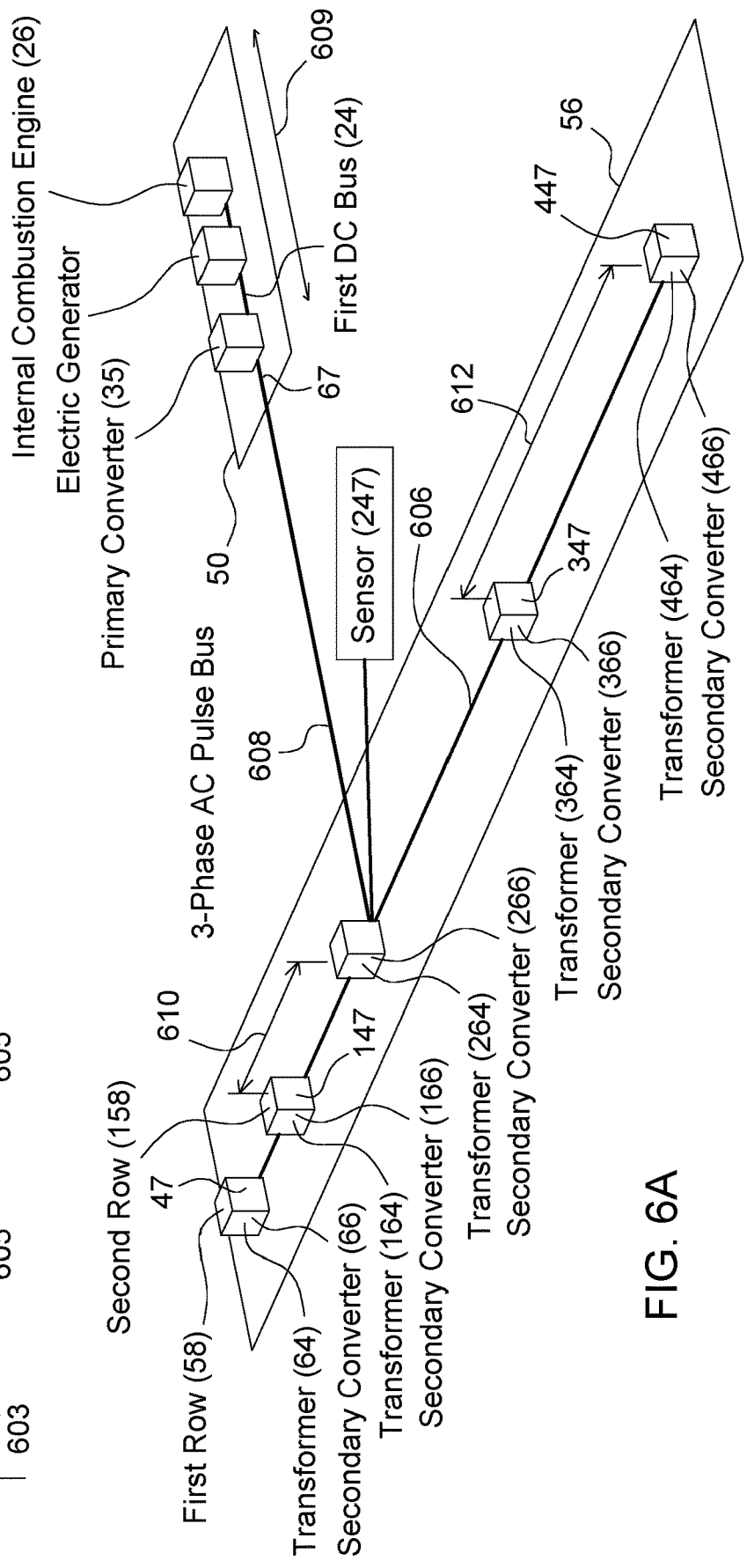

SYSTEM FOR CONTROLLING A DIRECT-CURRENT-TO-DIRECT-CURRENT CONVERTER TO PROVIDE ELECTRICAL ENERGY TO A VEHICLE IMPLEMENT

DISCLOSURE

This disclosure relates to system for controlling a direct-current to direct-current converter to provide electrical energy to a vehicle implement.

BACKGROUND

An off-road vehicle may be associated with vehicle implements that perform work tasks, such as agriculture, construction, mining, road repair and maintenance work tasks. The vehicle implement may control a source of rotational energy to adjust or move components of the implement to perform one or more work tasks. In certain prior art, the vehicle has an internal combustion engine that drives a generator to produce a direct current (DC) electrical bus at a higher DC voltage; the DC electrical bus provides electrical energy from the vehicle to the implement. At the implement, one or more direct-current-direct-current converters converts the higher DC voltage to a lower DC voltage for each corresponding load. However, as the number of DC-DC converters increases to supply electrical energy for multiple corresponding loads, the cost and weight of the implement also increases. Accordingly, there is a need for efficiently controlling a direct-current to direct-current converter in a vehicle-implement configuration.

SUMMARY

In accordance with one embodiment, a system for controlling a direct-current-to-direct-current converter comprises a primary converter and one or more secondary converters. The primary converter has primary semiconductor switches. A primary controller provides control signals to the primary semiconductor switches. One or more secondary converters are coupled in parallel to the primary converter via a set of conductors. Each secondary converter has secondary semiconductor switches.

Each one of the secondary converters has a corresponding transformer. The transformer comprises a primary winding or primary terminal associated with (or in electrical communication with) a primary alternating current (AC) signal of the primary converter. The transformer comprises a secondary winding or secondary terminal associated with a secondary alternating current (AC) signal of a corresponding one of the secondary converters. A secondary controller provides secondary control signals to the secondary semiconductor switches of the secondary converters with one or more time-synchronized, target phase offsets (e.g., respective custom phase offset or unique phase offset tailored or suited to each corresponding secondary converter) with respect to an observed phase (e.g., sampled phase measurements) of the alternating current signal (e.g., primary alternating current signal or the secondary alternating current signal) to provide the target phase offset (or targeted phase offsets) commensurate with or sufficient to support a required electrical energy transfer from the primary converter to the corresponding secondary converter (or secondary converters).

BRIEF DESCRIPTION OF THE DRAWINGS

FIG. 6A is an illustrative block diagram of a primary converter that is coupled to multiple secondary converters, where each secondary converter is associated a different row unit of an implement having a transverse member.

FIG. 6B is a graph of the signal magnitude versus time of the reference signal measured at the junction node.

DETAILED DESCRIPTION

In any of the above referenced drawings of this document, any arrow or line that connects any blocks, components, modules, multiplexers, sensors, switches, semiconductors, diodes, memory, data storage, data processors, electronic components, oscillators, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In one embodiment, the system disclosed in this document may comprise a computer-implemented system, method or converter in which one or more data processors process, store, retrieve, and otherwise manipulate data via data buses and one or more data storage devices (e.g., data storage device or memory) as described in this document and the accompanying drawings. As used in this document, "configured to, adapted to, or arranged to" mean that the data processor, converter or controller is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in any other drawing in this disclosure. Alternately, separately from or cumulatively with the above definition, "configured to, adapted to, or arranged to" can mean that the converter comprises one or more components described herein as software modules, equivalent electronic hardware modules, or both to execute any referenced functions, logic operations, mathematical operations, calculations, determinations, processes, methods, algorithms, subroutine.

Figure 1:
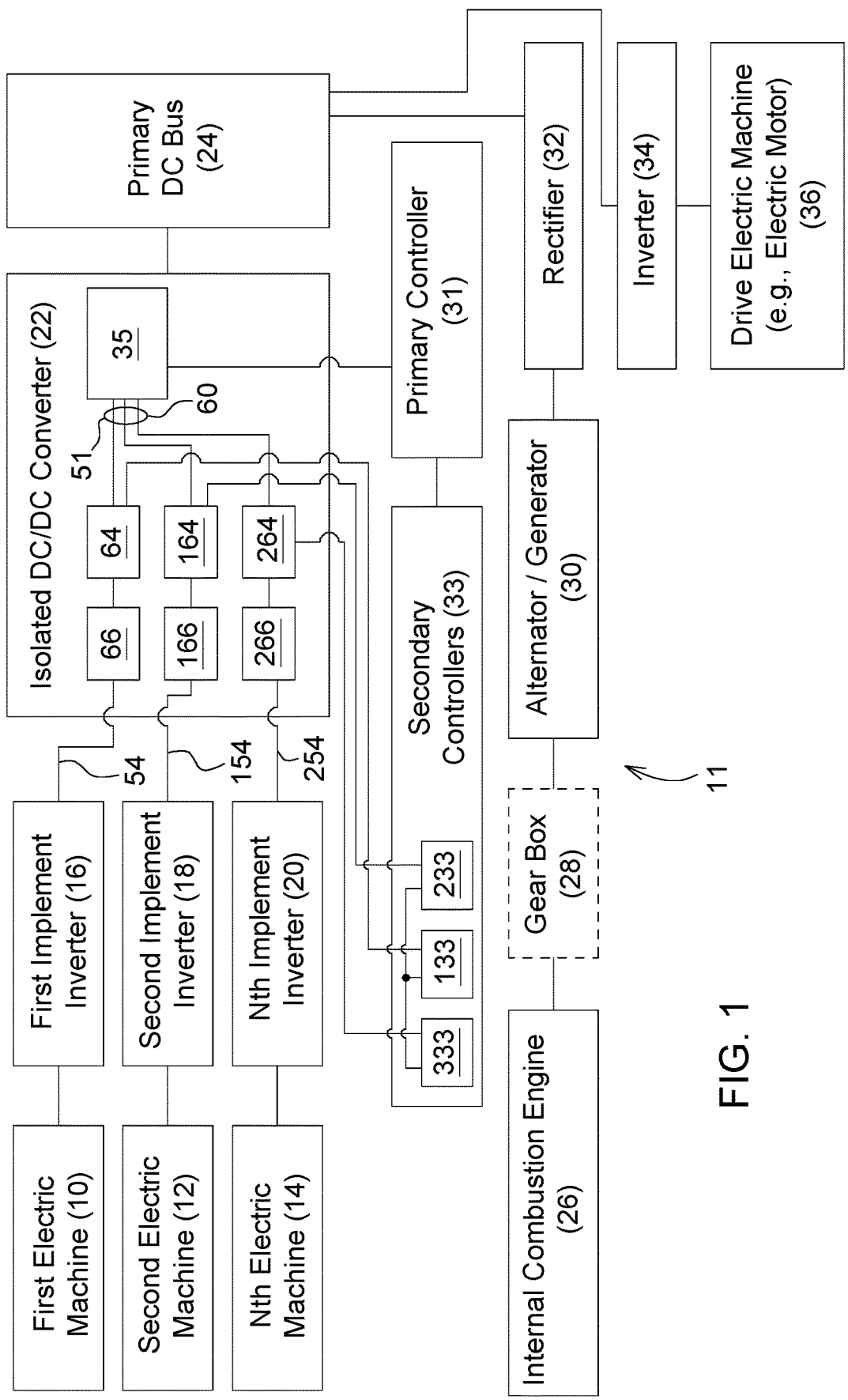
FIG. 1 is a block diagram of one embodiment of a system for controlling a direct-current to direct-current converter in the context of a hybrid vehicle.
Figure 3A:
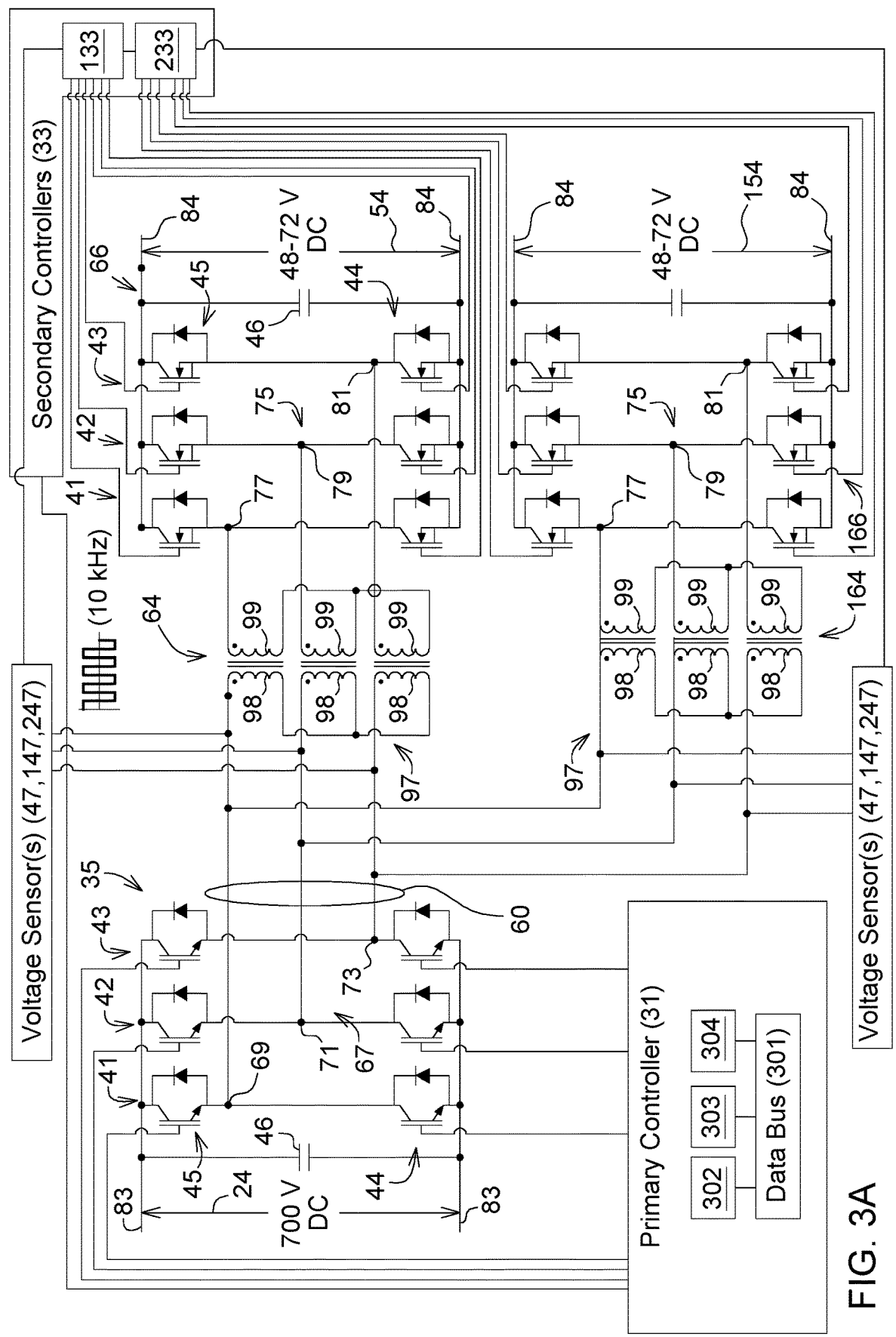
FIG. 3A is an illustrative schematic diagram of one embodiment of a system for controlling a direct-current to direct-current converter, consistent with FIG. 1 or FIG. 2.

In accordance with one embodiment of FIG. 1, a system 11 for controlling an electrically isolated, direct-current (DC)-to-direct-current (DC) converter 22 comprises a primary converter 35 and one or more secondary converters, such as a first secondary converter 66, a second secondary converter 166 and an Nth secondary inverter 266, where N equals any whole number greater or equal to three. Although FIG. 1 illustrates the system 11 where N equals three, virtually any number of secondary converters (66, 166, 266) may be used provided that the primary converter 35 can provide enough current to drive the secondary converters (66, 166, 266). The primary converter 35 has primary semiconductor switches, such as low-side switches 44 and high-side switches 45, as illustrated in FIG. 3A. A primary controller 31 provides control signals to the primary semiconductor switches in the primary converter 35.

The primary converter 35 provides an alternating current (AC) voltage level (e.g., −700 VAC to +700 VAC) of the alternating current on the set of conductors 51, where the AC voltage level is conducive or compatible with transmission of electrical energy efficiently over extended distances (e.g., that can exceed 35 meters) within the vehicle-implement configuration, where it is possible to have commercially available row planters (e.g., 48 rows) that are approximately 37 meters wide or sprayers with 40 meter boom widths. The first voltage level (e.g., 700 VDC) of the DC current on the primary DC bus 24 is higher than a second voltage level (e.g., 56 VDC) of one or more secondary DC buses (54, 154, 254).

In accordance with one embodiment, a system 11 for controlling a direct-current-to-direct-current converter 22 comprises a primary converter 35 and one or more secondary converters (66, 166, 266). The primary converter 35 has primary semiconductor switches. A primary controller 31 provides primary control signals to the primary semiconductor switches. One or more secondary converters are coupled in parallel to the primary converter 35 via a set of conductors 51. Each secondary converter (66, 166, 266) has secondary semiconductor switches, such as low-side switches 44 or high-side switches 45.

Each one of the secondary converters (66, 166, 266) has a corresponding transformer (, 164, 264), such as a first transformer 64, a second transformer 164, or a third transformer 264. At the primary terminals 97, the transformer (64, 164, 264) comprises a primary winding 98 associated with (or in electrical communication with) a primary alternating current (AC) signal of the primary converter 35. At the secondary terminals (e.g., coupled AC input terminals 75 of the secondary converter), the transformer (64, 164, 264) comprises a secondary winding 99 associated with a secondary alternating current signal of a corresponding one of the secondary converters (66, 166, 266).

Within the set of conductors 51 (in FIG. 1), each conductor 51 has a particular transmission line length arising from a separation, on a vehicle-implement configuration, between the primary converter 35 (e.g., AC output node) and respective ones of the secondary converters (66, 166, 266). The particular transmission line length is associated with a respective inductance (e.g., particular aggregate inductance); respective phase delay associated with corresponding secondary converters (66, 166, 266) that is generally associated with the vehicle-implement configuration and stable, fixed over its lifetime.

A transformer (64, 164, 264) comprises a primary winding 98 and a secondary winding 99, where the primary winding 98 is associated with a primary alternating current (AC) signal of (or outputted by) the primary converter 35, where the primary AC signal has one or more output phases. A secondary winding 99 is associated with a secondary alternating current signal (AC) of each respective one of the secondary converters, where the secondary AC signal has one or more output phases. The primary winding 98 has primary terminals 97 and the secondary winding 99 has secondary terminals.

In one embodiment, one or more secondary controllers (33, 133, 233) provide secondary control signals to the secondary semiconductor switches of the secondary converters (66, 166, 266) with one or more time-synchronized, target phase offsets (e.g., respective custom phase offset or unique phase offset tailored or suited to each corresponding secondary converter) with respect to an observed reference phase (e.g., sampled phase measurements for respective time interval) of the alternating current signal (e.g., primary alternating current signal or the secondary alternating current signal) to provide the target phase offset (or targeted phase offsets) commensurate with or sufficient to support a required electrical energy transfer from the primary converter 35 to the corresponding secondary converters (66, 166, 266) (or secondary converters).

Within the set of conductors 51, each conductor 51 has a particular transmission line length arising from a spatial separation, on a vehicle-implement configuration, between the primary converter (e.g., AC output node) and respective ones of the secondary converters (e.g., or their transformers), as best illustrated FIG. 6A. The particular transmission line length is associated with a respective inductance (e.g., particular aggregate inductance) or respective phase delay that is different, fixed for each secondary converter (66, 166, 266).

In one embodiment, the set of conductors 51 have associated phase delays for the propagation of the wavelength(s) (or frequency or frequencies) of the primary alternating current signal and the secondary alternating current signal. For example, the phase delays depend on or are associated with transmission line lengths and respective inductances that arise from a spatial separation between the primary converter 35 and each of the secondary converters (66, 166, 266). Each secondary converter (66, 166, 66) has secondary semiconductor switches. One or more secondary controllers (33, 133, 233) provide control signals to the secondary semiconductor switches (of one or more secondary converters) with a time-synchronized, target phase offset with respect to observed reference phase (e.g., sampled phase measurements for a respective time interval) of the primary AC signal or secondary AC signal detected by one or more sensors (47, 147, 247). For example, the target phase offsets (or phase-delay-adjusted target phase offsets for one or more corresponding secondary controllers 33, 133, 233) are selected, based on the observed reference phase (e.g., sampled phase measurements for a respective sampling interval), to provide the target phase offsets (e.g., 90 degrees phase offset from the observed reference phase) commensurate with or sufficient to support a required electrical energy transfer from the primary converter 35 to one or more of the secondary converters (66, 166, 266).

In an alternate embodiment, the primary controller 31 communicates with the secondary controller 33 via a transmission line (e.g., data bus), or a wireless link to provide coordinated or synchronized control signals.

In one configuration, as illustrated in FIG. 3A the primary controller 35 comprises an electronic data processor 302, a data storage device 302, and data ports 304 that are coupled (or connected) to a data bus 301 to support communication among and between the electronic data processor 302, the data storage device 303 and the data ports 304, which may transmit control signals to the base terminal, gate terminal or other control terminals of the semiconductor switches (44, 45) of any converter or inverter. Similar to the block diagram of the primary controller 35 in FIG. 3A, each secondary controller (33, 133, 233) comprises an electronic data processor, a data storage device, and data ports that are coupled to a data bus to support communication among and between the electronic data processor, the data storage device and the data ports. The electronic data processor may comprise a microcontroller, a microprocessor, a logic device, a programmable logic array, a digital signal processor, an application specific integrated circuit or another data processing device. The data storage device comprises an electronic memory, nonvolatile random access memory, an optical storage device, a magnetic storage device, or another device for storing analog or digital data. The data port may comprise a communications device, a transceiver, a transmitter, data buffer memory, or another data interface for transmitting, storing and receiving data.

The electronic data processor or secondary controller (33, 133, 233) determines the target phase offset to provide the target phase offset (or targeted phase offsets) commensurate with or sufficient to support a required electrical energy transfer from the primary converter 35 to the corresponding secondary converter or secondary converters (66, 166, 266). In one embodiment, the electronic data processor or secondary controller (66, 166, 266) can adjust, maintain or increase the target phase offset (or delay-adjusted target phase offset for one or more corresponding secondary converters) up to a maximum phase offset (e.g., 90 degrees) with respect to an observed reference phase of the alternating current signal (e.g., primary AC signal at the primary terminals or the secondary AC signal at the secondary terminals of the respective transformer (64, 164, 264)) to transfer a commanded (or requested, or demanded) power from the primary converter 35 to the secondary converter (66, 166, 266). Conversely, the electronic data processor or secondary controller (33, 133, 233) can adjust, maintain or decrease the target phase offset (or delay-adjusted-target phase offset for one or more corresponding secondary converters) up to a minimum phase offset (e.g., 0 degrees) with respect to an observed reference phase of the alternating current signal (e.g. primary alternating current signal or the secondary alternating current signal) to transfer less power (consistent with commanded, requested or demanded power at the implement) from the primary converter to the secondary converter. The delay-adjusted target phase offset can be based on the observed reference phase measured by a sensor (47, 147, 247) at a first secondary converter 66 (e.g., master converter) or first transformer, then adjusted based on stored phase delay data stored in the data storage device of a second secondary converter 166 (e.g., slave converter) based on characterization, testing or factory measurements (associated with a specific vehicle-implement configuration) of the phase delay associated with a second secondary converter 166, and its associated particular transmission line and transmission path to the AC output terminals 67 of the primary converter 35.

In another alternate embodiment, a first secondary controller 33 is designated as a master secondary controller, where the first secondary controller 33 estimates the three-phase voltage (e.g., aggregate three-phase voltage or one or more output phases) at the junction node 60 at the primary terminals 97 of the transformer (64, 164, 264). Each time there is a zero crossing of estimated three-phase voltage, the first secondary controller 33 generates a pulse, where the pulse is communicated to the other secondary controllers (133, 233) via a vehicle data bus, an implement data bus, a transmission line, or a communications link (e.g., high speed communications line with minimal delay or fixed, stable known delay). Accordingly, the other secondary controller (133, 233) can synchronize their respective target phase offsets for the secondary converters (166, 266) to eliminate the requirement for voltage sensors (47, 147, 247) for each corresponding secondary controller (133, 233).

As illustrated in FIG. 1, secondary converters (66, 166, 266) are shown and a single primary converter 35 is shown. The direct-current to direct-current converter 22 comprises a primary controller 31, one or more secondary controllers (33, 133, 233), a primary converter 35 and a set of secondary converters (66, 166, 266). Each secondary converter (66, 166, 266) may be associated with a secondary winding 99 or secondary terminals of a transformer (64, 164, 264). Each secondary converter (66, 166, 266) may comprise a proportional integral controller or voltage regulator to maintain a desired or target DC voltage level output (e.g., a target voltage within the voltage range of approximately 12 VDC to approximately 60 VDC).

At the secondary direct current bus (54, 154, 254) respective direct current (DC) outputs of secondary converters (66, 166, 266) are coupled to corresponding implement inverters. For example, as illustrated in FIG. 1, a first secondary converter 66 is coupled to a corresponding first implement inverter 16; a second secondary converter 166 is coupled to a corresponding second implement inverter 18; and a third secondary converter 266 is coupled to a corresponding third implement inverter 20 or Nth implement inverter, where N equals any positive whole number equal to or greater than three.

The first implement inverter 16 can accept a direct current (DC) input and convert it to one or more alternating current (AC) outputs (or output phases) for application to a first electric machine 10; a second implement inverter 18 can accept a direct current (DC) input and convert it to one or more alternating current (AC) outputs (or output phases) for application to a second electric machine 12; a third implement inverter 20 can accept a direct current (DC) input and convert it to one or more alternating current (AC) outputs for application to a third electric machine 14.

The primary converter 35 is coupled to the primary direct current (DC) bus 24 and the primary DC bus 24 is also coupled to a rectifier 32 than can provide a source of direct current voltage or energy to power the direct-current to direct-current converter 22 by an alternator 30 (or generator) from the rotational mechanical energy provided, directly or indirectly, by an internal combustion engine 26.

Figure 2:
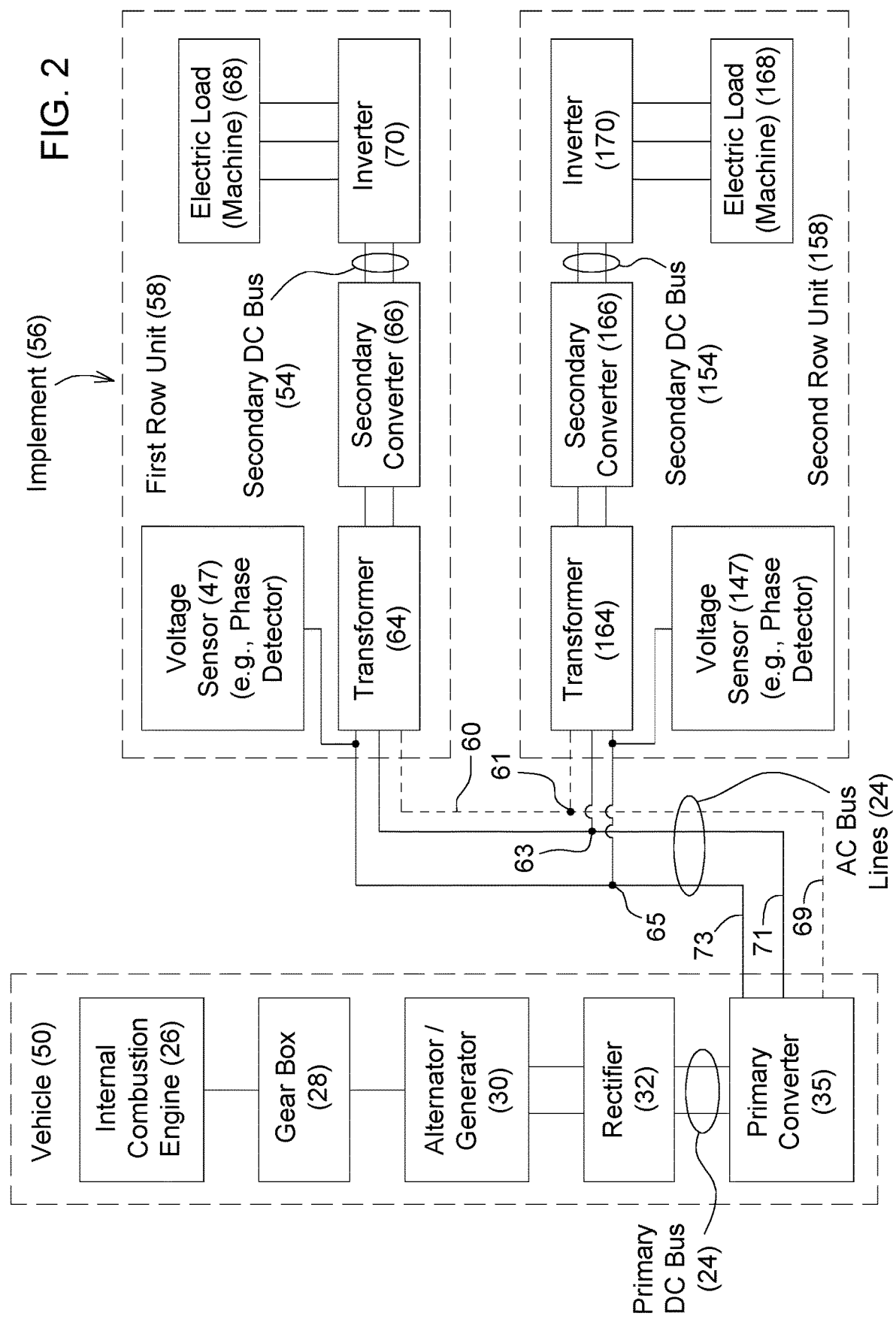
FIG. 2 is a block diagram of another embodiment of a system for controlling a direct-current to direct-current converter in the context of a hybrid vehicle.

As illustrated in FIG. 1 and FIG. 2 in the context of a hybrid vehicle 50, a hybrid vehicle 50 system comprises an internal combustion engine 26 that provides rotational energy to an optional gear box 28 or directly to an alternator 30, such as an alternator or a generator. In turn, the alternator 30 provides an alternating current (AC) output signal to the rectifier 32 when the rotor of alternator 30 is rotated. Further, the inverter 34 is coupled to the primary DC bus 24, where the inverter 34 converts the direct current (DC) output of the primary DC bus 24 into alternating current (AC) for application to a drive electric machine 36 (e.g., electric motor). The optional gear box 28 is indicated as optional by the dashed lines in FIG. 1 and FIG. 2.

In one configuration in FIG. 3A, a voltage sensor (47, 147, 247), which may be referred to as primary phase detector, detects an observed reference phase of the primary AC signal at a primary winding 98 or primary terminals of the transformer (64, 164, 264) of the secondary converter (66, 166, 266) or respective secondary converter. As illustrated in FIG. 3A one or more voltage sensors (47, 147, 247) may be associated with each secondary converter (66, 166, 266), where at least one voltage sensor or phase detector is associated with any known output phase terminal of the secondary converter. In one configuration, the first voltage sensor 47 is associated with a first output phase of the secondary converter 66; the second voltage sensor 147 is associated with a second output phase of the secondary converter 66; a third voltage sensor 247 is associated with the third output phase of the third converter 66.

Figure 3B:
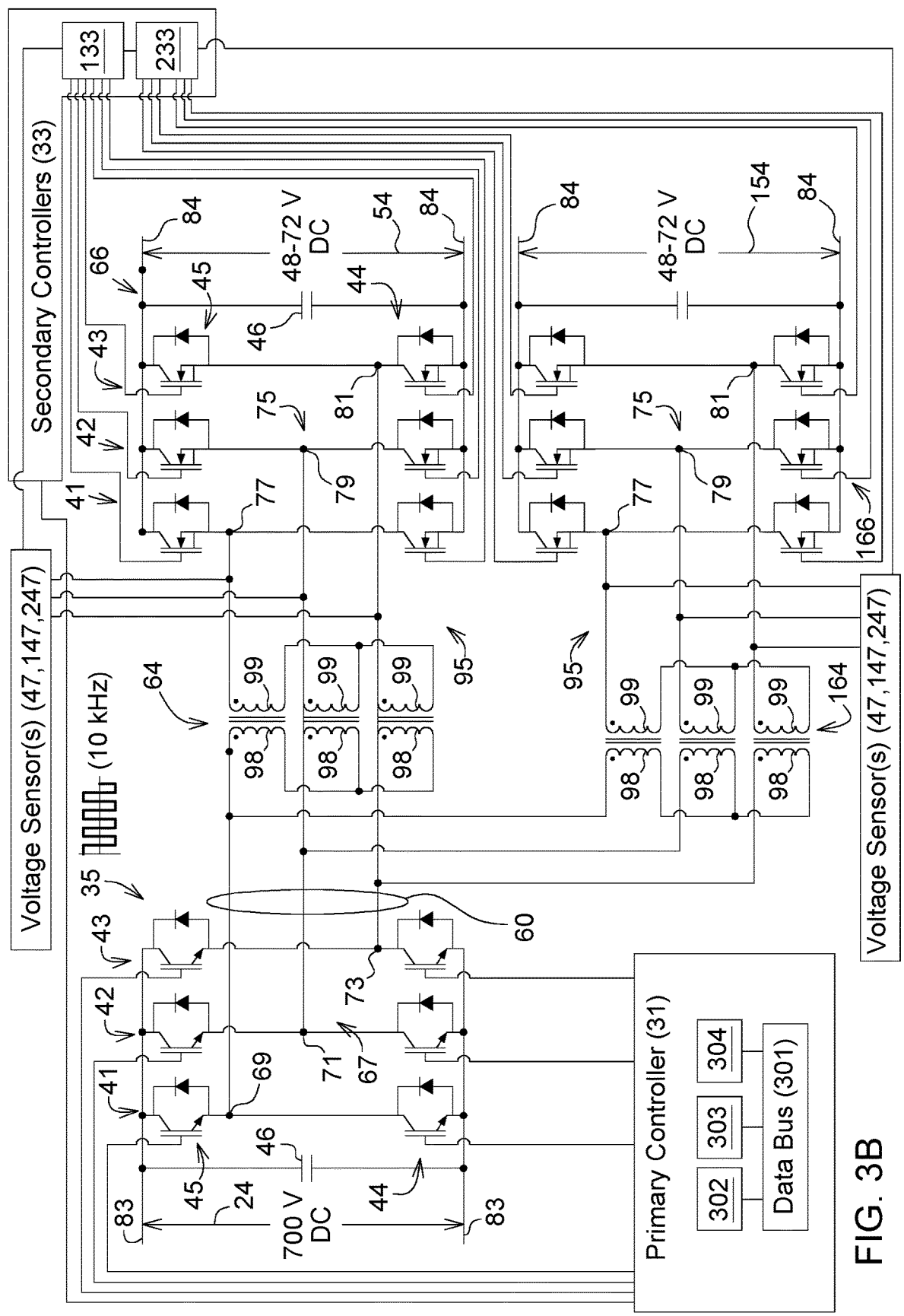
FIG. 3B is an illustrative schematic diagram of another embodiment of a system for controlling a direct-current to direct-current converter, consistent with FIG. 1 or FIG. 2.

In another configuration, in FIG. 3B a voltage sensor (47, 147, 247), which may be referred to as a secondary phase detector, detects an observed phase of the secondary alternating current signal at a secondary winding 99 or secondary terminals of the transformer (66, 166, 266) of the secondary converter. Alternately, the voltage sensor (47, 147, 247), which detects secondary phase detector detects an observed reference phase at the AC input terminals 75 of the secondary converter (66, 166, 266). For example, the secondary phase detector (e.g., 47, 147, 247) can be coupled to the secondary winding 99 of the transformer (64, 164, 264) of a secondary converter where there is a known inductance or fixed inductor between the secondary winding terminal and the secondary converter (66, 166, 266). As illustrated in FIG. 3B one or more voltage sensors (47, 147, 247) may be associated with each secondary converter (66, 166, 266), where at least one voltage sensor or phase detector is associated with any known output phase terminal of the secondary converter. In one configuration, the first voltage sensor 47 is associated with a first output phase of the secondary converter 66; the second voltage sensor 147 is associated with a second output phase of the secondary converter 66; a third voltage sensor 247 is associated with the third output phase of the third converter 66.

In one embodiment, each voltage sensor (47, 147 or 247) comprise phase a detector, such as a first phase detector, a second phase detector and a third phase detector. Each phase detector may comprise a phase comparator, a mixer and a reference oscillator, a phase extractor circuit or logic device, a phase-locked loop or another device for phase or frequency detection of a signal. In one example, the first phase detector (e.g., 47) or the second phase detector (e.g., 147) comprises: (a) a low-pass filter for generating a reference signal (604 in FIG. 6B) from the observed AC signal (e.g., 603) and (b) a detector for detecting when the filtered signal crosses a DC voltage reference level 605 (e.g., zero volts DC).

In an alternate embodiment, a single reference voltage sensor (e.g., single reference phase detector) is active or associated with only a first one of secondary converters (e.g., first secondary converter 66 or master secondary converter) to detect an observed reference phase of the alternating current signal (e.g., primary AC signal or secondary AC signal). In the alternate embodiment, the non-reference secondary converters or other secondary converters (e.g., slave secondary converters, second secondary converters 166, and third secondary converters 266) may have no voltage sensors, no phase detectors, inactive voltage sensors, or inactive phase detectors, where the particular vehicle-implement configuration or as—installed configuration of the direct current to direct current converter 32 is associated with the set of conductors 51 for the AC signal (between the primary converter and each secondary converter) of fixed, known transmission line propagation delays (at the wavelength of the AC signal) to derive target phase offset to adjust the observed reference phase to provide an delay-adjusted target phase offset for the second secondary converter 166 and any third secondary converter 266. For example, the characterization of the fixed known transmission line propagation delays may be stored a data structure in the data storage device (e.g., 303) of the primary controller 31 or one or more secondary controllers (33, 133, 233).

For example, one or more reference voltage sensors (47, 147, 247) are connected or coupled to measure: (a) a first AC output signal of a first phase 41 at primary terminals 97; (b) a second AC output signal of a second phase 42 at the primary terminals 97, and (c) a third AC output signal of a third phase 43 at the primary terminals to provide three reference signals (or observed reference phase measurements) for determination of the respective target phase offset for each of the secondary converters (66, 166, 266). The target phase offset for each secondary converter is unique and different from the other secondary converters.

In one embodiment, a first secondary controller 33 provides first secondary control signals for a first phase, a second phase and third phase of first secondary semiconductor switches of the first secondary converter 66 with a time-synchronized, target phase offsets with respect to the observed reference phase of the first phase (or another phase) estimated by the voltage sensor (47, 147, 247) at the primary terminal or secondary terminal of the first transformer 64 associated with the corresponding first secondary converter 66. The first phase, the second phase or the third phase of the alternating current signal (secondary AC signal) are inputted to the respective first secondary converter 66. Similarly, a second secondary controller 133 provides second secondary control signals for a first phase, a second phase and third phase of second secondary semiconductor switches of the second secondary converter 166 with a time-synchronized, target phase offsets with respect to the respective observed reference phase of the first phase (or another phase) estimated by the second voltage sensor (47, 147, 247) of the second secondary converter 166. The first phase, second phase or the third phase of the alternating current signal is inputted to the respective second secondary converter. Similarly, a third secondary controller 233 provides third secondary control signals for a first phase, a second phase and third phase of third secondary semiconductor switches of the third secondary converter 266 with a time-synchronized, target phase offsets with respect to the respective observed reference phase of the first phase (or another phase) estimated by the second voltage sensor (47, 147, 247) of the third secondary converter 266. The first phase, second phase or the third phase of the alternating current signal is inputted to the respective second secondary converter.

In one configuration, each of the sensors (47, 147, 247) comprises a phase detector that is associated with a primary winding or a primary terminal of the corresponding transformer (64, 164, 264) for measuring or detecting the respective observed reference phase of the corresponding primary alternating current signal transmitted to the respective secondary converter (66, 166, 266). For example, the first transformer 64 is associated with the first secondary converter 66 and its observed reference phase of the primary AC signal; the second transformer 164 is associated with the second secondary converter 166 and its observed reference phase of the primary AC signal; the third transformer 264 is associated with the third secondary converter 266 and its observed reference phase of the primary AC signal. Further, the alternating current signal comprises a phase of the corresponding alternating current signal selected from the phases consisting of a first phase, a second phase and a third phase of the primary converter 35.

In another configuration, each of the sensors (47, 147, 247) comprises a phase detector that is associated with a secondary winding or a secondary terminal of the corresponding transformer (64, 164, 264) for measuring or detecting the respective observed reference phase of the corresponding secondary alternating current (AC) signal transmitted to the respective secondary converter (66, 166, 266). For example, the first transformer 64 is associated with the first secondary converter 66 and its observed reference phase of the secondary AC signal; the second transformer 164 is associated with the second secondary converter 166 and its observed reference phase of the secondary AC signal; the third transformer 264 is associated with the third secondary converter 266 and its observed reference phase of the secondary AC signal. Further, the alternating current signal comprises a phase of the corresponding alternating current signal selected from the phases consisting of a first phase, a second phase and a third phase of the primary converter 35.

In an alternate configuration, only one observed voltage sensor (47, 147, 247) is used for all of the secondary converters (66, 166, 266) because of the availability of a factory setting, testing, or initial calibration of phase delay adjustment data, associated with the transmission line 51 path, for a particular model, implement configuration, or vehicle implement configuration, where the phase delay adjustment data may be stored in a data storage device (303) of the primary controller 31, the secondary controllers (33, 133, 233) as a file, look-up table, inverted file, database, equation, reference parameters, or another data structure. Accordingly, during initialization of the system 11 the primary controller 31, the secondary controller 33, or the electronic data processor of the primary controller 31 or the secondary controller 33 may retrieve or access the stored phase delay adjustment data to adjust the observed reference phase offset, which is derived from phase measurements by one or more sensors (47, 147, 247) for non-reference secondary converters (e.g., 166, 266). The non-reference secondary converters (e.g., 166, 266) apply the stored phase delay adjustment data to the observed reference phase offset from the sensor 47 at the first secondary converter 66 (e.g., reference or master secondary converter) to determine or estimate phase-adjusted target phase offset. Further, if voltage sensors (47, 147, 247) associated with the second secondary converter 166 or third secondary converter 266 fail or are not available, the above alternate configuration can be used in lieu of performing the observations or measurements by the observed voltage sensors (47, 147, 247) of such secondary converters (166, 266) during each session or activation of the vehicle, or the implement, or the vehicle-implement configuration.

In an alternate embodiment, a voltage sensor (47, 147, 247) is configured to: (a) measure one or more observed voltages of primary AC signals or secondary AC signals voltages (e.g., root-mean-squared voltage, peak voltage or other alternating current voltage measurement) and (b) provide the measurements observed voltage readings of the primary AC signal or secondary AC signal (e.g., at the transformer terminals of the primary winding 98 and secondary winding 99) to the electronic controller (of any secondary controller (33, 133, 233) via one or more data ports.

In another alternate embodiment, the first voltage sensor 47 and the second voltage sensor 147 may measure one or more of the following: alternating current (AC) voltage levels, root-mean-squared (RMS) voltage levels, or rectified alternating current (e.g., via a half-wave or full-wave bridge rectifier 32) at one or more transformer windings.

A primary converter 35 has an alternating current (AC) output at a primary output node or junction node 60. The secondary converters (66, 166, 266) are coupled in parallel with each other to the primary output node or junction node 60, such as first junction node 61, a second junction node 63 and a third junction node 65, as illustrated in FIG. 2. Referring to FIG. 3A, a first transmission line length (e.g., of conductor 51) separates the first junction node 61 from the first primary AC output node 69; a second transmission line length (e.g., of conductor 51) separates the second junction node 63 from the second primary AC output node 71; a third transmission line length separates the third junction node 65 from the third primary AC output node 73. In certain embodiments, the first transmission line length, the second transmission line length and the third transmission line length are substantially equal, with corresponding equal inductance and phase delay, at the junction node 60. The primary output node or junction node 60 is coupled to a plurality of transformers (64, 164, 264) at the primary winding 98 of each transformer. Each secondary converter (66, 166, 266) is associated with a corresponding transformer (64, 164, 264). Each transformer (64, 164, 264) provides an intermediate interface (for the AC signal) between the primary converter 35 and a secondary converter (66, 166, 266).

Secondary converters (66, 166, 266) are coupled in parallel to a primary converter 35 via a set of conductors 51 (in FIG. 1). Each secondary converter (66, 166, 266) may have a corresponding secondary position (e.g., in three dimensions or three-dimensional coordinates), on the vehicle-implement configuration, that is spatially separated from a primary position (e.g., in three dimensions or three-dimensional coordinates) of the primary converter 35 such that the set of conductors 51 that service the secondary converter (between the junction and the AC input terminals of the secondary converter) has a unique transmission line length with a respective inductance that arises from the separation (e.g., actual cable harness or conductor length associated with the difference between the primary position and secondary position) between the primary converter 35 and the respective secondary converter (66, 166, 266).

Each secondary converter (66, 166, 266) has secondary semiconductor switches. To compensate for the respective transmission line delay for the alternating current signal on conductors 51, between the primary converter 35 and the corresponding secondary converter (66, 166, 266), a secondary controller (33, 133, 233) provides secondary control signals to the secondary semiconductor switches of the secondary converters with one or more time-synchronized, target phase offsets (e.g., respective custom phase offset or unique phase offset tailored or suited to each corresponding secondary converter) with respect to an observed reference phase (e.g., observed phase measurements) of the alternating current signal (e.g., primary alternating current signal or the secondary alternating current signal) to provide the target phase offset (or targeted phase offsets) commensurate with or sufficient to support a required electrical energy transfer from the primary converter 35 to the corresponding secondary converter (or secondary converters 66, 166, 266). The respective transmission delay of the AC signal on conductor may be affected by respective inductances in the transmission line path between the primary converter 35 and the corresponding secondary converter (66, 166, 266), for example.

In one embodiment, the secondary position of a corresponding secondary converter (66, 166, 266) comprises a lateral position associated with a particular row unit of an implement 56. In practice, some implements may have lateral positions that span over a range of approximately 40 meters. Accordingly, the set of conductors 51 that service the secondary converter (66, 166, 266) has a unique transmission line length with a respective inductance that arises from a spatial separation, on the vehicle-implement configuration, between the primary position of primary converter 35 and the respective secondary converter (66, 166, 266). To compensate for the respective inductance associated with each corresponding secondary converter (66, 166, 266), one or more secondary controllers (33, 133, 233) provide secondary control signals to the secondary semiconductor switches (of one or more secondary converters) with a time-synchronized, target phase offset with respect to a primary AC signal or a secondary AC signal observed by a voltage sensor (47, 147, 247) at the transformer (64, 164, 264).

Figure 5:
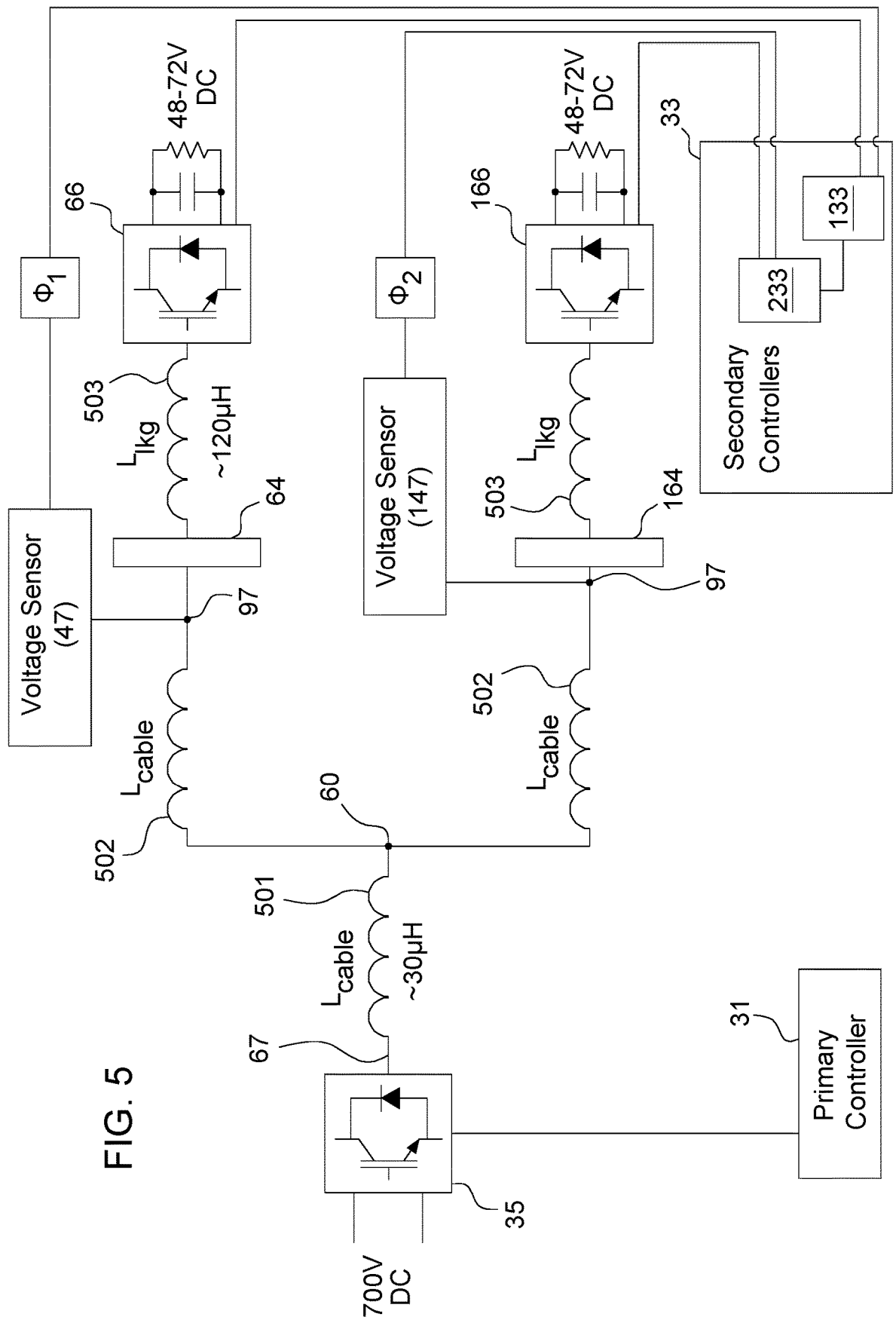
FIG. 5 is a schematic diagram that illustrates a potential inductance in a cable or transmission line between the primary converter and the secondary converter.

In one embodiment, the (reference) voltage sensor (47, 147, 247) comprises a phase detector that can detect a reference phase of the AC output signal of one or more phases of the primary converter 35 at the primary winding 98 or primary terminals 97, or at the secondary winding 99 or secondary terminals. The secondary controller (33, 133, 233), or its electronic data processor, can estimate or determine a different target phase offset (e.g., $\Phi_1$ or $\Phi_2$ as illustrated in FIG. 5) for each secondary converter (66, 166, 266) based on one or more of the following: (1) observed reference phase measurements at such secondary converter (66, 166, 266), or (2) observed phase reference measurements at the voltage sensor (47) at the first secondary converter 66, and stored phase-delay adjustment data stored in the data storage device (303) of secondary controller 33, and/or (3) demanded, required or commanded power (e.g., expressed a percentage of maximum available power or a ratio of commanded power to maximum available power) at one or more secondary DC buses (54, 154, 254) (e.g., as perceived by the primary controller 31, or one or more secondary controllers (33, 133, 233), which can communicate with one another via a vehicle data bus, an implement data bus, or communications line.

In one exemplary configuration, the particular transmission line length (e.g., of conductors 51) of the AC line between the primary converter 35 and any corresponding secondary converter (66, 166, 266) comprises a transmission line length between the AC output node (69, 71, 73) of primary converter 35 and the primary terminals (of the primary windings 98) of respective one of the transformers (64, 164, 264). At each secondary inverter (66, 166, 266), the secondary AC input terminals 75 (e.g., AC input node) comprises a first secondary AC input node 77, a second secondary AC input node 79 and a third secondary AC input node 81, as illustrated in FIG. 3A.

In FIG. 5, in one configuration the inductance of the particular transmission line length (e.g., of conductors 51) of the AC line between the primary converter 35 and any corresponding secondary converter (66, 166, 266) means an aggregate particular inductance that comprises one or more of the following: (a) a primary inductance 501 (in FIG. 5), where the primary inductance 501 arises from, or is associated with, the primary length of cable, transmission line or conductors between the primary AC output terminals 67 of the primary converter 35 and the junction node 60, which provides the same phase lag or delay to all of the secondary converters (66, 166, 266); or (b) a secondary inductance 502 (in FIG. 5) between the junction node 60 and AC input terminals 75 of each secondary converter (66, 166, 266), or its respective transformer (64, 164, 264), wherein the secondary inductance 502 is different for each secondary converter (66, 166, 266) with a different cable length between the junction node 60 the corresponding AC input terminals 75 (or the transformer) of each secondary converter (66, 166, 266); (c) modeled transformer inductance, such as leakage inductance 503 or cross-coupling inductance between different conductors associated with different secondary converters (66, 166, 266).

The systems of FIG. 1 and FIG. 2 are similar, except the system of FIG. 2 further includes an electric load (68, 168), rather than an electric machine (10, 12, 14) of FIG. 1. In either FIG. 1 or FIG. 2, the load may comprise an electric motor or some other non-rotating electric load. Like numbers in FIG. 1 and FIG. 2 indicate like features or elements.

In the context of FIG. 1 and FIG. 2, the energy source may comprise any of the following: an alternator 30, a generator, a battery or a capacitor 46. The energy source is coupled to the direct current (DC) primary terminals (e.g., input terminals). For example, as illustrated in FIG. 1, the energy source comprises a generator that is coupled or connected to the primary DC bus 24, or an alternator 30 that is coupled to the primary DC bus 24 via a rectifier 32.

One or more loads (10, 12, 14, 68, 168) are coupled to the primary DC bus 24 or the secondary DC bus 54. In FIG. 1, the first electric machine 10, second electric machine 12, and the Nth electric machine 14 are loads that are coupled to the secondary DC bus (54, 154, 254) via one or more inverters (16, 18, 20), where N is any positive whole number equal to or greater than three. Similarly, the drive electric machine 36 is a load that is connected to the primary DC bus 24 via an inverter 34.

The DC-to-DC converter 22 that comprises the primary converter 35, the secondary converter and the transformer (64, 164, 264) can operate bi-directionally, such as where the electrical energy is transferred in either direction between the DC primary terminals (of the primary DC bus 24) and the DC secondary terminals (of one or more secondary DC buses 54, 154, 254). In one direction, the energy source at the DC primary terminals 84 of the primary DC bus 24 can power one or more loads at the DC secondary terminals (84) of the secondary DC buses (54, 154, 254). However, in the opposite direction, one or more loads at the DC secondary terminals 84 can provide excess or transient energy to the DC primary terminals to charge the energy source (e.g., in a braking mode of the vehicle 50).

As illustrated in FIG. 3A, a capacitor 46, such as a primary capacitor is placed across the DC primary terminals and a secondary capacitor is placed across the DC secondary terminals, where the primary capacitor and the secondary capacitor are used for filtering (e.g., to reduce noise, such as voltage ripple in the DC voltage).

In certain embodiments, the DC primary terminals 83 are configured to operate at a different voltage level than the DC secondary terminals 84. In other embodiments, the primary DC bus 24 and the secondary DC bus 54 can have variable voltage levels that can fluctuate with one or more loads or operating conditions on a dynamic basis for each time interval (e.g., sampling time of DC voltage observed at the DC primary input and DC secondary output terminals of the converter). For example, the DC primary terminals 83 operate at a higher voltage level or higher voltage range (e.g., approximately 400 VDC to approximately 800 VDC) than a lower voltage level or lower voltage range (e.g., approximately 12 VDC to approximately 400 VDC) the DC secondary terminals 84. Accordingly, the electronic assembly or DC-to-DC converter 22 supports a vehicle 50 with different DC bus levels that are isolated from each other because the transformer (64, 164, 264) blocks DC energy from passing through between transformer primary and transformer secondary.

Although the DC primary terminals (e.g., DC primary bus) and the DC secondary terminals (e.g., DC secondary bus) have fixed voltage levels, the primary voltage ($V_1$) at (or across) the transformer primary winding 98, or the secondary voltage (V$_2$) at (or across) the transformer secondary winding 99, or both can vary.

FIG. 3A is a schematic diagram of one embodiment of a direct-current-to-direct-current converter 22 (DC-to-DC converter) that comprises a primary converter 35 coupled to a secondary converter (66, 166, 266) via a transformer (64, 164). A primary converter 35 comprises first pair of primary switches, a second pair of primary switches, and a third pair of primary switches. In a first phase 41 the first pair of primary switches is coupled between direct current (DC) primary terminals 83 (e.g., input terminals) of the primary converter 35; in the second phase 42 the second pair of primary switches is coupled between DC primary terminals 83 (e.g., input terminals) of the primary converter 35; in the third phase 43 the third pair of primary switches is coupled between DC primary terminals 83 (e.g., input terminals) of the primary converter 35. The first pair, second pair and third pair of primary switches may be referred to as a primary converter 35, where the primary controller 31 controls the primary switches of the primary converter 35.

In one embodiment, the DC-to-DC converter 22 comprises a three-phase, dual DC-to-DC converter 22 with DC primary terminals 83 (e.g., DC input terminals) at the primary converter 35 and DC secondary terminals (84, 184, e.g., DC output terminals) at the secondary converters (66, 166, 266), where the DC-to-DC converter 22 may operate unidirectionally or bidirectionally (e.g., to transfer electrical power or energy from the DC input 83 of the primary converter 35 to the DC outputs (84, 184) of the secondary converter (66, 166), or vice versa).

Each pair of primary switches comprises a low-side switch 44 and a high-side switch 45. Similarly, each pair of secondary switches comprises a low-side switch 44 and a high-side switch 45. Each switch has switched terminals that are controlled by a control terminal (e.g., gate or base of a transistor). For example, if the switch is a field effect transistor, such as a metal oxide semiconductor field effect transistor (MOSFET) (e.g., Silicon Carbide MOSFET), the switched terminals comprise a source and drain terminal and the control terminal comprises a gate terminal. In one configuration, for each pair of primary switches, the switched terminals of the low-side switch 44 are coupled in series to the switched terminals of the high-side switch 45 between the DC primary terminals 83. As illustrated in FIG. 3A, each switch has a protective diode coupled in parallel to the switched terminals of the respective switch. In one embodiment, the switches may comprise silicon carbide field effect transistors or other wide-band-gap semiconductor devices.

In the primary converter 35, the switched terminals of the first pair of low-side switch 44 and the high-side switch 45 are coupled together at a first node or first primary AC output node 69 associated with a first phase of primary alternating current (AC) signal. In the primary converter 35, the switched terminals of the second pair of low-side switch 44 and the high-side switch 45 are coupled together at a second node or second primary AC output node 71 associated with a second phase of the primary alternating current signal. In the primary converter 35, the switched terminals of the third pair of low-side switch 44 and the high-side switch 45 are coupled together at a third node or third primary AC output node 73 associated with a third phase of the primary alternating current signal.

A secondary converter (66, 166, 266) comprises a first pair of secondary switches, a second pair of secondary switches, and a third pair of secondary switches between DC secondary terminals 84 (e.g., output terminals) of the secondary converter (66, 166, 266). In the first phase 41 the first pair of secondary switches is coupled between direct current secondary terminals 84 (e.g., output terminals) of the secondary converter (66, 166, 266); in the second phase 42 the second pair of secondary switches is coupled between DC secondary terminals 84 (e.g., output terminals) of the secondary converter (66, 166, 266); in the third phase 43 the third pair of secondary switches is coupled between DC secondary terminals (e.g., output terminals) of the secondary converter (66, 166, 266).

Each pair of secondary switches comprises a low-side switch 44 and a high side switch 45. Each secondary switch has switched terminals that are controlled by a control terminal (e.g., gate or base). For example, if the switch is a field effect transistor, such as a metal oxide semiconductor field effect transistor (MOSFET) (e.g., silicon carbide MOSFET devices), the switched terminals comprise a source and drain terminal and the control terminal comprises a gate terminal. As illustrated in FIG. 3A, each secondary switch has a protective diode coupled in parallel to the switched terminals of the respective switch.

In the DC-to-DC converter 22 in one illustrative configuration, each diode facilitates current dissipation associated with the respective switch, to which the diode is coupled in parallel, to reduce transient voltages across the switch (e.g., during a prior turn-off, prior deactivation or prior dead-time of the switch in preparation) for the next turning on of the switch, or next activating of the switch. In one embodiment, the protective diodes may be composed gallium nitride diodes or other semiconductor materials.

In the secondary converter (66, 166, 266), in the first phase 41 the switched terminals of the first pair of secondary switches, which comprise a low-side switch 44 and the high-side switch 45, are coupled together at a fourth node (e.g., first secondary AC input node 77) associated with a secondary alternating current signal. In the second phase 42 in the secondary converter 66, the switched terminals of the second pair of the secondary switches, which comprise a low-side switch 44 and the high-side switch 45 are coupled together at a fifth node (e.g., second secondary AC input node 79) associated with the secondary alternating current signal. In the third phase 43 of the secondary converter, the switched terminals of the third pair of the secondary switches, which comprise a low-side switch 44 and the high-side switch 45 are coupled together at a sixth node (e.g., third secondary AC input node 81) associated with the secondary alternating current signal.

In one embodiment, a transformer (64, 164, 264) is coupled (e.g., in the alternating current transmission line) between the primary converter 35 and the secondary converter (66, 166, 266). For example, at the primary terminals 97 primary winding 98 of the transformer (64, 164) is coupled to a first node (e.g., first primary AC output node 69) of the first pair of primary switches; a second node (e.g., second primary AC output node 71) of second pair of primary switches, and a third node (e.g., third primary AC output node 73) of the third pair of primary switches. Similarly, at the secondary terminals a secondary winding 99 of the transformer (64, 164) is coupled to a fourth node (e.g., first secondary AC input node 77), the fifth node (e.g., second secondary AC input node 79) and the sixth node (e.g., third secondary AC input node 81).

The transformer (64, 164, 264) has at least one primary winding 98 and at least one secondary winding 99, where a transformer ratio (n) represents a voltage ratio between the primary terminals and the secondary terminals, or between the primary winding 98 and the secondary winding 99. For example, the primary winding ratio may represent the number of relative turns (n) of the primary winding 98 to the secondary winding 99. The voltage ratio or winding ratio (turn ratio) may depend upon the winding configuration, the conductor configuration, and the configuration of any core, such as ferromagnetic core, a ferrite core, or an iron core.

In one embodiment, a modeled inductance ($L_{lkg}$) 503 (e.g., variable inductor) is coupled in series with the primary winding 98 (or secondary winding 99) of the transformer (64, 164, 264), or is modeled as leakage inductance or cross-coupling inductance of the transformer and/or conductors for different secondary converters (66, 166, 266).

In an alternate embodiment, the modeled inductance is associated with a set of discrete inductors that can be connected, via a set of switches, in series, in a parallel, or both, to achieve an adjustable aggregate inductance. For example, the controller (31, 33) or data processor 302 can control or adjust the variable inductor, or its associated switches, to tune the transformer (64, 164, 264) to adjust the total inductance to equalize or compensate for delay at different secondary converters (66, 166, 266), alone or together with synchronization of control signals that the primary controller 31 and the secondary controller (33, 133, 233) apply to the primary switches of the primary converter 35 and/or the secondary switches of one or more secondary converters (66, 166, 266).

In one embodiment, in FIG. 3A an electronic data processor 302, such as an electronic controller, is configured to provide time-synchronized control signals to the control terminals of the primary switches and secondary switches to control the converter to operate efficiently with respect to a reference signal derived from observations or measurements of the voltage sensor 47 at the AC output node of the primary converter 35. Further, the primary controller 31 and the secondary controller (33, 133, 233) can control, with synchronization relative to the reference signal, the switches of primary converter 35 and the secondary converter to operate in a first control mode, a second control mode, or a third control mode, wherein the first control mode comprises a phase-shift mode, the second control mode comprises a triangular waveform control mode and wherein the third control mode comprises a trapezoidal waveform control mode.

In one embodiment, the primary controller 31, the secondary controller (33, 133, 233) or both may be referred to as a controller; the controller comprises an electronic data processor 302, a data storage device 303, and one or more data ports 304 coupled to or in communication with a data bus 301. The electronic data processor 302, the data storage device 303, and one or more data ports 304 may communicate data messages between each other via the data bus 301.

The electronic data processor 302 comprises a microcontroller, a microprocessor, a programmable logic array, a logic device, an arithmetic logic unit, a digital signal processor, an application specific integrated circuit or another device for processing or manipulating data. The data storage device 303 comprises electronic memory, nonvolatile random-access memory, magnetic storage device, an optical storage device, or another device for storing, retrieving and managing data, files, data structures or data records. The data ports 304 may comprise an input/output port, a data transceiver, a wireline transceiver, a wireless transceiver, buffer memory, or a combination of the foregoing items.

In one embodiment, the electronic data processor 302 or its data ports 304 are connected to or in communication with the control terminals of the switches (e.g., primary switches and the secondary switches) of the primary converter 35 and the secondary converter. Accordingly, the electronic controller (31, 33) can control the synchronization, timing and operation of each switch (e.g., primary switch or secondary switch), such as activation time, deactivation time, biasing and other aspects with respect to one or more other switches (e.g., primary switch or secondary switch) with respect to the reference signal (e.g., synchronization pulse) provided by the voltage sensor 47 at the primary output node or AC output of the primary converter 35. Further, the switches can operate with a same or substantially similar fixed duty cycle (e.g., 50 percent duty cycle plus or minus ten percent tolerance) for multiple or all modulation modes, such as the first mode, the second mode and the third mode. In some configurations, the peak magnitude and duration of the gate signal of the high-side switch 45 and low-side switch 44 of any pair or phase will generally be equal or substantially equivalent.

The system of FIG. 3B is similar to the system of FIG. 3A, except the system of FIG. 3B has voltage sensors (47, 147, 247) that measure the secondary AC signal at secondary windings 99 of the transformer (64, 164, 264). Meanwhile, the system of FIG. 3A has voltage sensors (47, 147, 247) that measure the primary AC signal at primary windings 98 of the transformer (64, 164, 264). Like reference numbers in FIG. 3A and FIG. 3B indicate like elements or features.

Figure 4:
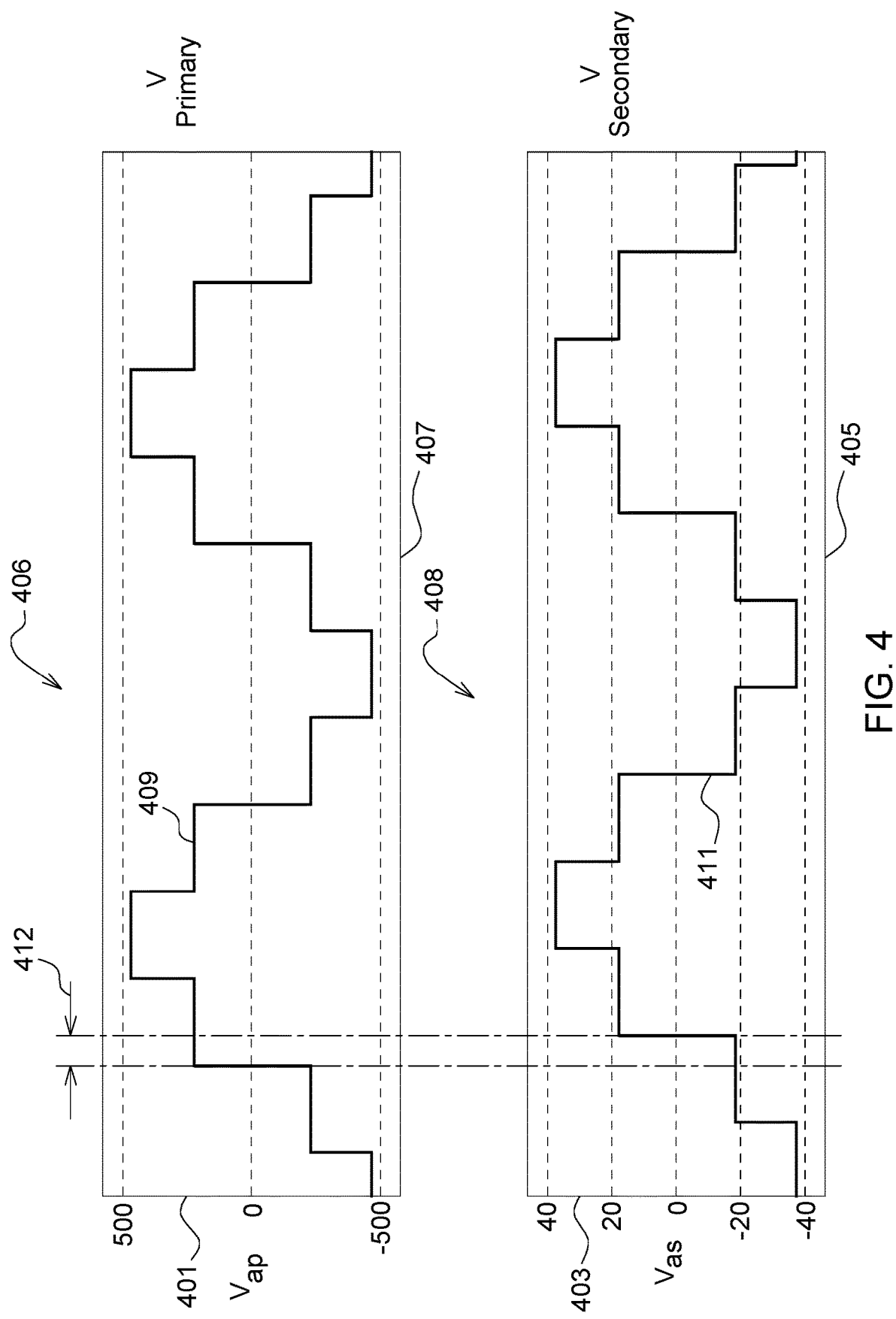
FIG. 4 discloses illustrative graphs of the primary voltage of the transformer versus time and the secondary voltage of the transformer versus time.

An upper graph of FIG. 4 illustrates a primary waveform 406 of the primary voltage of the transformer (64, 164, 264) versus time 407. Meanwhile, a lower graph of FIG. 4 illustrates a secondary waveform 408 of the secondary voltage of the transformer (64, 164, 264) versus time 407. In the upper graph and the lower graph, the vertical axis indicates the signal magnitude (401, 403), whereas the horizontal axis represents time (407, 405). As illustrated, the primary voltage 409 of primary waveform 406 has a greater magnitude than the secondary voltage 411 of the secondary waveform 408, where the primary voltage 409 and the secondary voltage 411 are proportional to each other; governed by the winding ratio or number of relative turns (n) between the primary winding 98 and the secondary winding 99 of the transformer (64, 164, 264). Further, the secondary voltage and primary waveform 409 has a phase lag or phase delay with respect to the primary voltage and secondary waveform 411.

FIG. 5 is a schematic diagram that illustrates a potential inductance in a cable or transmission line between the primary converter 35 and one or more secondary converters (66, 166, 266). FIG. 5 illustrates the primary converter 35 is associated with a set of secondary converters (66, 166, 266) that are coupled to parallel to the AC output nodes of the primary converter 35. In FIG. 5, the cables, conductors or transmission lines between the primary converters 35 and the secondary converters (66, 166, 266) are modeled as illustrative primary inductances 501 and secondary inductances 502. Further, an additional modeled inductance 503 or variable inductor is associated with each transformer (64, 164, 264), such as leakage inductance or cross-coupling inductance between different conductors 51 associated with corresponding respective secondary converters (66, 166, 266).

FIG. 6A is an illustrative block diagram of a primary converter 35 that is coupled to multiple secondary converters (66, 166, 266), where each secondary converter is associated with a transformer (64, 164, 264, 364, 464) and an implement 56. A vehicle 50 moves or tows an implement 56 or trailer. For example, each secondary converter (66, 166, 266, 366, 466) is associated with a corresponding transformer (64, 164, 264, 364), which can be located at or near the intersection of longitudinal member 608 (e.g., longitudinal implement member) with a transverse member 606 (e.g., transverse implement member) that is generally orthogonal to the longitudinal implement member 608.

In FIG. 6B, the reference voltage sensor (47, 147, 247) or phase detector can use the leading edge of pulse train or zero crossing point 605 of the AC signal (e.g., primary AC signal or secondary AC signal) as a reference phase measurement for synchronizing the application of control signals to the switches of the primary converter 35 and the secondary converters (66, 166, 266). FIG. 6B is a graph of the signal magnitude 601 versus time 602 of the reference signal 603 measured at the junction node 60 and correlated to the local reference signal 604 of the primary controller 31, or the secondary controller (33, 133, 233) shown in dashed lines.

The phase reference or phase reference measurement is available for the secondary controller (33, 133, 233) to derive a target phase offset from the phase reference to apply to each secondary converter (66, 166, 266). One or more secondary controllers (33, 133, 233) can provide a unique or particular target phase offset for each secondary converter (66, 166, 266) that is matched or commensurate with its different cable length or different phase delay owing to the vehicle-implement configuration, such as its transverse position (e.g., raw position) of or on the transverse member 606. For example, each transverse position of the secondary converters is associated with a different row unit, where each row unit is associated with a row spacing (e.g., 24 inches, 30 inches, or 36 inches).

In one embodiment, as illustrated in FIG. 6A, each secondary converter (66, 166, 266, 366, 466) has a different transverse position along the transverse member 606 of an implement 56 of the vehicle-implement configuration, which provides a route or path for the different transmission line lengths (e.g., cable lengths) between the primary AC output node 67 (of the primary converter 35) and the corresponding AC input terminals of each secondary converter (66, 166, 266, 366, 466), or its respective transformer (64, 164, 264, 364, 464). However, in alternate embodiments, the secondary converters (66, 166, 266, 366, 466), which are electrically coupled to the primary converter 35 via conductors, may have virtually any relative spatial separation, relative orientation or relative position with respect to each other to accommodate different machine forms, vehicles, and implements.

In one example, the vehicle-implement configuration may comprise a vehicle 50 with an integral implement 56, such as a sprayer with a traverse member 606 (e.g., boom, such as a 40 meter long boom, with sprayer nozzles) of the implement 56 that is generally orthogonal to a longitudinal axis 609 of the vehicle 50, the implement 56, or both. In another example, the vehicle-implement configuration may comprise a propulsion vehicle 50 or a tractor that tows an implement 56, such as planter or cultivator with row units separated from each other by transverse spatial separations (610, 612) along a transverse member 606 of the implement 56 that is generally orthogonal to a longitudinal axis 609 (and a longitudinal implement member 608) of the vehicle 50, the implement 56, or both.

Accordingly, in some configurations of the vehicle-implement configuration, each secondary converter (66, 166, 266, 366, 466) has a different secondary inductance 502 or different phase delay (e.g., phase lag) with respect to the AC output terminals 67 of the primary converter 35 or the junction node 60. Accordingly, one or more secondary controllers (33, 133, 233) provides a corresponding different target phase offset in the secondary control signals to each secondary converter (6 166, 266, 366, 466) based on the observed reference phase measurements detected by one or more sensors (47, 147, 247), to provide the target phase offset (or targeted phase offsets) commensurate with or sufficient to support a required electrical energy transfer from the primary converter 35 to the corresponding secondary converter (or secondary converters 66, 166, 266).

In one embodiment, the primary converter 35 comprises a three-phase converter and each of the secondary converters comprises a three-phase converter. In one configuration, the vehicle-implement configuration comprises the primary converter 35 mounted on a vehicle 50 with propulsion unit, where the secondary converters (66, 166, 266) are mounted on an implement 56 that is towed or carried by the vehicle 50. The implement 56 may comprise row units (58, 158, 258) mounted on a traverse member 606 that is generally orthogonal to a longitudinal axis 609 of the implement 56 or vehicle 50, where the longitudinal axis 609 of the vehicle 50 (or implement) is typically aligned with the vehicle heading or yaw angle (or implement heading) in the direction of travel.

As illustrated in FIG. 6A, the row units include a first row unit 58, a second row unit 158 and third or Nth row unit 258, where N equals any positive whole number equal to or greater than three. In certain embodiments, each row unit (58, 158, 258) has an electric motor that is coupled to a corresponding one of the secondary converters (66, 166, 256) to distribute, eject, inject, spray seed, plants, rootstock, or crop inputs, such as pesticide, fertilizer, nutrients, herbicide, fungicide, or other treatments. In other embodiments, for each row unit (58, 158, 258) the electric motor is coupled to the corresponding one of the secondary converters (66, 166, 266) via respective one of the implement inverters (16, 18, 20) to control the torque or velocity of the electric motor.

The primary controller 31 and the secondary controller (33, 133, 233) may control the primary converter 35 and the secondary converter with pulse width modulation, phase modulation, space vector pulse width modulation or other modulation techniques, along with the the target phase offset of each secondary converters with respect to observed phase measurements of the primary AC signal and the secondary AC signal to control or manage power transfer from the primary converter 35 to one or more secondary converters (66, 166, 266). Further, the AC waveform at the AC output for the primary converter 35 may be sinusoidal, triangular or trapezoidal to support efficient operation of the primary converter 35 and the secondary converters (66, 166, 266) with soft-switching events to minimize aggregate heat dissipation requirements of the direct-current to direct-current converter 22.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. A system for controlling a direct-current-to-direct-current converter comprising:
   a primary converter, the primary converter having primary semiconductor switches;
   a primary controller providing control signals to the primary semiconductor switches;
   a plurality of secondary converters comprising a first secondary converter and a second secondary converter, the first and second secondary converters coupled in parallel to the primary converter via a set of conductors, each of the first and second secondary converters having secondary semiconductor switches;
   a plurality of transformers, each one of the first and second secondary converters associated with a corresponding one of the transformers, each of the transformers comprising a primary winding associated with a primary alternating current signal of the primary converter and a secondary winding associated with a secondary alternating current signal of a corresponding one of the first and second secondary converters;
   a plurality of primary sensors, at least one of the primary sensors associated with a corresponding one of the transformers, each of the primary sensors configured for measuring or detecting a respective observed reference phase of an output phase of the corresponding primary alternating current signal transmitted to one of the first and second secondary converters; and
   a plurality of secondary controllers comprising a first secondary controller and a second secondary controller, the first and second secondary controllers providing secondary control signals to the respective secondary semiconductor switches of the first and second secondary converters with time-synchronized, target phase offsets with respect to the observed reference phase of the primary alternating current signals, to provide the target phase offsets commensurate with or sufficient to support a required electrical energy transfer from the primary controller to at least one of the first and second secondary controllers;
   the first secondary controller providing first secondary control signals for a first phase, a second phase and a third phase of first secondary semiconductor switches of the first secondary converter with time-synchronized, target phase offsets with respect to the respective observed reference phase of the first phase, the second phase or the third phase of the primary alternating current signal; and
   the second secondary controller providing second secondary control signals for a first phase, a second phase and a third phase of second secondary semiconductor switches of the second secondary converter with time-synchronized, target phase offsets with respect to the respective observed reference phase of the first phase, the second phase or the third phase of the primary alternating current signal,
   wherein each of the primary sensors comprises a phase detector that is associated with the primary winding or a primary terminal of the corresponding transformer for measuring or detecting the respective observed reference phase of the corresponding primary alternating current signal transmitted to a respective one of the first and second secondary converters.

2. The system according to claim 1 wherein the corresponding primary alternating current signal comprises a phase of the corresponding primary alternating current signal selected from the phases consisting of the first phase, the second phase and the third phase of the primary converter.

3. The system according to claim 1 wherein each conductor within the set has a particular transmission line length arising from a separation, on a vehicle-implement configuration, between the primary converter and respective ones of the first and second secondary converters, the particular transmission line length associated with a respective inductance, wherein the first secondary controller measures the observed reference phase and wherein:
   the second secondary controller is adapted to store, in a data storage device, a phase delay characterization data related to the particular phase delay associated with the second secondary controller and its particular transmission line length;
   an electronic data processor of the second secondary controller is configured to adjust the observed reference phase provided by the first secondary controller.

4. The system according to claim 3 wherein each of the first and second secondary converters has a different transverse position along a transverse member of an implement which provides a different transmission line length between a primary AC output node of the primary converter, or a junction node, and corresponding AC input terminals of each of the first and second secondary converters.

5. The system according to claim 1 wherein each of the first and second secondary converters has a different secondary inductance or different phase delay, each of the first and second secondary controllers providing a corresponding different target phase offset in the secondary control signals to each of the first and second secondary converters to preserve a target phase offset based on the observed reference phase of one of the primary alternating current signal or of the secondary alternating current signal.

6. The system according to claim 1 wherein the primary converter comprises a three-phase converter and wherein each of the first and second secondary converters comprises a three-phase converter.

7. The system according to claim 1 wherein a vehicle-implement configuration of the direct-current-to-direct-current converter comprises the primary converter mounted on a vehicle with propulsion unit and wherein each of the first and second secondary converters is mounted on an implement that is towed or carried by the vehicle.

8. The system according to claim 7 wherein the implement comprises row units mounted on a traverse member that is generally orthogonal to a longitudinal axis of the implement.

9. The system according to claim 8 wherein each row unit has an electric motor that is coupled to a corresponding one of the first and second secondary converters to dispense seed or crop inputs.

10. The system according to claim 9 wherein for each row unit the electric motor is coupled to the corresponding one of the first and second secondary converters via respective ones of a plurality of implement inverters to control a torque or velocity of the electric motor.

11. A system for controlling a direct-current-to-direct-current converter comprising:
    a primary converter, the primary converter having primary semiconductor switches;
    a primary controller providing control signals to the primary semiconductor switches;
    a plurality of secondary converters comprising a first secondary converter and a second secondary converter, the first and second secondary converters coupled in parallel to the primary converter via a set of conductors, each of the first and second secondary converters having secondary semiconductor switches;

a plurality of transformers, each one of the first and second secondary converters associated with a corresponding one of the transformers, each of the transformers comprising a primary winding associated with a primary alternating current signal of the primary converter and a secondary winding associated with a secondary alternating current signal of a corresponding one of the first and second secondary converters;

a plurality of secondary sensors, at least one of the secondary sensors associated with a corresponding one of the transformers, each of the secondary sensors configured for measuring or detecting a respective observed reference phase of an output phase of the corresponding secondary alternating current signal transmitted to one of the first and second secondary converters; and a plurality of secondary controllers comprising a first secondary controller and a second secondary controller, the first and second secondary controllers providing secondary control signals to the respective secondary semiconductor switches of the first and second secondary converters with time-synchronized, target phase offsets with respect to the observed reference phase of the secondary alternating current signals, to provide the target phase offsets commensurate with or sufficient to support a required electrical energy transfer from the primary controller to at least one of the first and second secondary controllers;

the first secondary controller providing first secondary control signals for a first phase, a second phase and a third phase of first secondary semiconductor switches of the first secondary converter with time-synchronized, target phase offsets with respect to the respective observed reference phase of the first phase, the second phase or the third phase of the secondary alternating current signal; and the second secondary controller providing second secondary control signals for a first phase, a second phase and a third phase of second secondary semiconductor switches of the second secondary converter with time-synchronized, target phase offsets with respect to the respective observed reference phase of the first phase, the second phase or the third phase of the secondary alternating current signal;

wherein each of the secondary sensors comprising a phase detector is associated with the secondary winding or a secondary terminal of the corresponding transformer for measuring or detecting the respective observed reference phase of the corresponding secondary alternating current signal transmitted to a respective one of the first and second secondary converters.

12. The system according to claim 11 wherein the corresponding secondary alternating current signal comprises a phase of the corresponding secondary alternating current signal selected from the phases consisting of the first phase, the second phase and the third phase of one of the first and second secondary converters.

13. The system according to claim 11 wherein each of the first and second secondary converters has a different secondary inductance or different phase delay, each of the first and second secondary controllers providing a corresponding different target phase offset in the secondary control signals to each of the first and second secondary converters to preserve a target phase offset based on the observed reference phase of one of the primary alternating current signal or the secondary alternating current signal.

14. The system according to claim 11 wherein the primary converter comprises a three-phase converter and wherein each of the first and second secondary converters comprises a three-phase converter.

15. The system according to claim 11 wherein a vehicle-implement configuration of the direct-current-to-direct-current converter comprises the primary converter mounted on a vehicle with propulsion unit and wherein each of the first and second secondary converters is mounted on an implement that is towed or carried by the vehicle.

16. The system according to claim 15 wherein the implement comprises row units mounted on a traverse member that is generally orthogonal to a longitudinal axis of the implement.

17. The system according to claim 16 wherein each row unit has an electric motor that is coupled to a corresponding one of the first and second secondary converters to dispense seed or crop inputs.

18. A system for controlling a direct-current-to-direct-current converter comprising:

a primary converter, the primary converter having primary semiconductor switches;

a primary controller providing control signals to the primary semiconductor switches;

a plurality of secondary converters comprising a first secondary converter and a second secondary converter, the first and second secondary converters coupled in parallel to the primary converter via a set of conductors, each of the first and second secondary converters having secondary semiconductor switches;

a plurality of transformers, each one of the first and second secondary converters associated with a corresponding one of the transformers, each of the transformers comprising a primary winding associated with a primary alternating current signal of the primary converter and a secondary winding associated with a secondary alternating current signal of a corresponding one of the first and second secondary converters;

a plurality of sensors, at least one of the sensors associated with a corresponding one of the transformers, each of the sensors configured for measuring or detecting a respective observed reference phase of an output phase of the corresponding primary alternating current signal or secondary alternating current signal transmitted to one of the first and second secondary converters; and a plurality of secondary controllers comprising a first secondary controller and a second secondary controller, the first and second secondary controllers providing secondary control signals to the respective secondary semiconductor switches of the first and second secondary converters with time-synchronized, target phase offsets with respect to the observed reference phase of the primary alternating current signals or the secondary alternating current signals, to provide the target phase offsets commensurate with or sufficient to support a required electrical energy transfer from the primary controller to at least one of the first and second secondary controllers;

the first secondary controller providing first secondary control signals for a first phase, a second phase and a third phase of first secondary semiconductor switches of the first secondary converter with time-synchronized, target phase offsets with respect to the respective observed reference phase of the first phase, the second phase or the third phase of the primary alternating current signal or the secondary alternating current signal; and the second secondary controller providing second secondary control signals for a first phase, a second phase and a third phase of second secondary semiconductor switches of the second secondary converter with time-synchronized, target phase offsets with respect to the respective observed reference phase of the first phase, the second phase or the third phase of the primary alternating current signal or the secondary alternating current signal, wherein each conductor within the set has a particular transmission line length arising from a separation, on a vehicle-implement configuration, between the primary converter and respective ones of the first and second secondary converters, the particular transmission line length associated with a respective inductance, wherein the first secondary controller measures the observed reference phase, wherein:

the second secondary controller is adapted to store, in a data storage device, a phase delay characterization data related to the particular phase delay associated with the second secondary controller and its particular transmission line length; and wherein:

an electronic data processor of the second secondary controller is configured to adjust the observed reference phase provided by the first secondary controller.

* * * * *